Nov. 16, 1965  A. E. MURRAY ETAL  3,217,596
INFRARED REFRACTING LENS SYSTEM
Filed March 15, 1962  3 Sheets-Sheet 1

FIG.1a.

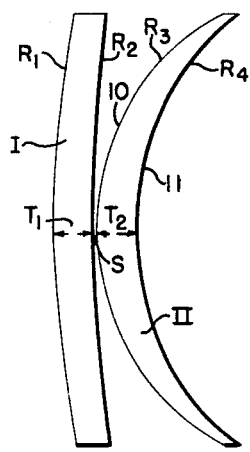

FIG.1b.

| f=118.43mm | SILICON DOUBLET | f/1 |
|---|---|---|
| LENS | N3.5u | RADII | THICKNESS |
| I | 3.45 | R₁=359.53mm | T₁=15mm |
|  |  | R₂=557.64mm |  |
|  |  |  | S=1.0mm |
| II | 3.45 | R₃=88.86mm | T₂=15mm |
|  |  | R₄=100.00mm |  |

FIG.1c.

| SILICON DOUBLET |||||
|---|---|---|---|---|
| EQUIVALENT FOCAL LENGTH=118.43mm | BACK FOCUS =99.68mm | SPHERICAL ABERRATION AT f/1.0=0.08550 mm | SINE CONDITION COMA AT f/1.0=0.0006 ||
| FIELD ANGLE | MINIMUM MERIDIONAL CIRCLE OF CONFUSION DIAMETER OF f/1.0 UNVIGNETTED | ASTIGMATISM |||
|  |  | T | S | T-S |
| 0° | 0.025 m rad |  |  |  |
| 2.5° | 0.015 m rad. | 99.28 | 99.53 | -0.25 |
| 5.0° | 0.065 m rad | 98.09 | 99.08 | -0.99 |
| 7.5° | 0.189 m rad | 96.17 | 98.36 | -2.19 |
| 10.0 | 0.410 m rad | 93.5 | 97.36 | -3.79 |

INVENTORS.
ALLEN E. MURRAY
MAXIMILIAN J. HERZBERGER
BY
ATTY.
AGENT.

Nov. 16, 1965    A. E. MURRAY ETAL    3,217,596
INFRARED REFRACTING LENS SYSTEM
Filed March 15, 1962    3 Sheets-Sheet 2

FIG.2a.

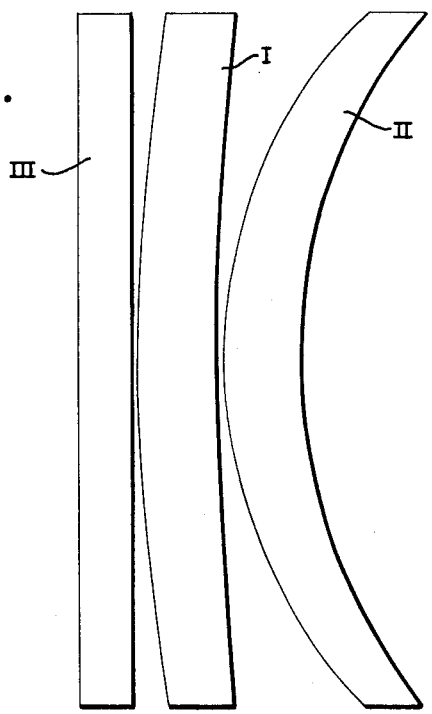

FIG.2b.

| SILICON TRIPLET ||||
|---|---|---|---|
| EQUIVALENT FOCAL LENGTH=119.35 mm | BACK FOCUS = 100.57 mm | SPHERICAL ABERRATION AT $f_{1.0}$ = -0.227 mm | SINE CONDITION COMA AT $f_{1.0}$ = -0.00248 |

| FIELD ANGLE | MINIMUM MERIDIONAL CIRCLE OF CONFUSION DIAMETER AT $f_{1.0}$ UNVIGNETTED | ASTIGMATISM |||
|---|---|---|---|---|
| | | T | S | T-S |
| 0° | 0.040 m rad. | | | |
| 2.5° | 0.032 m rad. | 100.10 | 100.37 | -0.27 |
| 5.0° | 0.042 m rad. | 98.89 | 99.92 | -1.03 |
| 7.5° | 0.067 m rad. | 96.90 | 99.29 | -2.39 |
| 10.0° | 0.285 m rad. | 94.19 | 98.13 | -3.94 |

INVENTORS.
ALLEN E. MURRAY
MAXIMILIAN J. HERZBERGER
BY
*Hodges* ATTY.
*Frank P. Presta* AGENT.

Nov. 16, 1965      A. E. MURRAY ETAL      3,217,596
INFRARED REFRACTING LENS SYSTEM
Filed March 15, 1962                      3 Sheets-Sheet 3

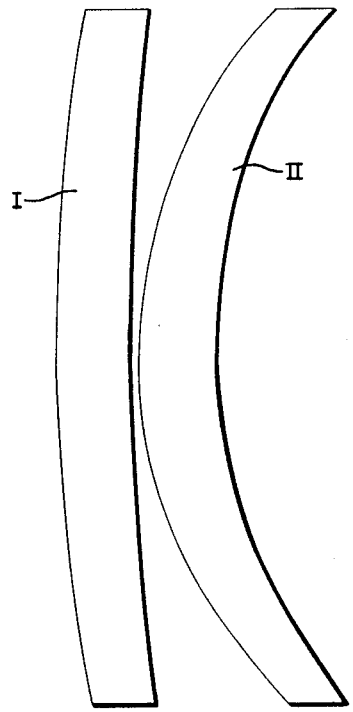
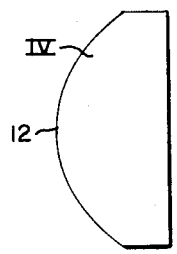

| SILICON DOUBLET WITH PLANO-CONVEX SAPPHIRE FIELD LENS ||||||
| EQUIVALENT FOCAL LENGTH = 70.24 mm | BACK FOCUS = 1.66 mm | SPHERICAL ABERRATION AT $f/_{1.0}$ = -0.165 | SINE CONDITION COMA AT $f/_{1.0}$ = -0.00248 |||
| FIELD ANGLE | MINIMUM MERIDIONAL CIRCLE OF CONFUSION DIAMETER AT $f/_{1.0}$ UNVIGNETTED || ASTIGMATISM |||
| | | | T | S | T-S |
| 0° | 0.047 m rad. |||||
| 2.5° | 0.026 m rad. || 1.66 | 1.60 | +0.06 |
| 5.0° | 0.061 m rad. || 1.73 | 1.44 | +0.29 |
| 7.5° | 0.120 || 1.81 | 1.15 | +0.66 |
| 10.0° | 0.274 || 2.01 | 1.30 | +0.71 |

INVENTORS,
ALLEN E. MURRAY
MAXIMILIAN J. HERZBERGER
BY
*OE Hodges* ATTY.
*Frank P. Presta* AGENT.

United States Patent Office 3,217,596
Patented Nov. 16, 1965

3,217,596
INFRARED REFRACTING LENS SYSTEM
Allen E. Murray and Maximilian J. Herzberger, Rochester, N.Y., assignors, by mesne assignments, to the United States of America as represented by the Secretary of the Navy
Filed Mar. 15, 1962, Ser. No. 180,060
1 Claim. (Cl. 88—57)

This invention relates to a lens system and more particularly to an infrared refracting lens system of high relative aperture.

In the infrared regions of the spectrum, it has been the general practice to use mirror systems as fast objectives owing to their advantages of enabling all wavelengths of radiation to come to the same focus, producing the same image size in all wavelength regions, and producing significantly smaller third order spherical aberration at the same focal lengths and relative apertures than a refractive lens having an index of refraction less than about 4.35. Mirror objectives, however, possess one overwhelming disadvantage, namely, the focal surface intervenes between the object and mirror, necessitating the loss of the central part of the mirror for image forming purposes, with a resulting degrading of contrast and severe limiting of the attainable field. Hence, other expedients are necessary for wide field purposes where substantial unvignetted image fields are required or where space limitations restrict element diameters. Refractive systems must therefore be used where central obscuration or substantial vignetting is not tolerable. Thus, it is a general purpose of this invention to provide an infrared refracting system which embraces many of the advantages of previously employed mirror systems and which possesses none of the aforedescribed disadvantages.

It is an object of this invention to provide a fast infrared refracting lens system of high relative aperture utilizing a material with high refractive index.

It is another object to provide a fast lens system which substantially corrects for spherical aberration and sine condition coma.

It is a further object to provide a refracting lens system having a relatively large image field and capable of forming a real image of an infinitely distant object.

It is a still further object to provide a lens system whereby the field may be flattened and the astigmatism substantially improved at very high relative apertures.

Other objects and various further features of novelty and invention will be apparent to those skilled in the art from a reading of the following specification and claim in conjunction with the accompanying drawings, which show, for illustrative purposes only, preferred forms of the invention and in which:

FIG. 1a is a side elevational view of a doublet lens forming one embodiment of the invention;

FIG. 1b is a tabulation of the specifications of the lens shown in FIG. 1a;

FIG. 1c is a tabulation of the optical data for the lens shown in FIG. 1a;

FIG. 2a is a side elevational view of one modification of the embodiment shown in FIG. 1a;

FIG. 2b is a tabulation of the optical data for the lens shown in FIG. 2a;

FIG. 3a is a side elevational view of a second modification of the embodiment shown in FIG. 1a; and FIG. 3b is a tabulation of the optical data for the lens shown in FIG. 3a.

Referring first to FIG. 1a, a silicon doublet lens system is shown having a relative aperture of $f/1$. The lens system comprises two axially aligned optical components I and II separated by an air space. In the direction from the object space to the image space, the first component I is a convergent meniscus collective lens formed of silicon and the second component II is an aplanatic lens formed of silicon and provided with a convex surface 10 aplanatic to the axial object and a concave surface 11 concentric to the axial object, both of which will correct for spherical aberration and sine condition coma. This lens II reduces the divergence of the beam from the axial object, but will never produce convergence, that is, this lens always produces a virtual image of a real object at the design aplanatic point. In order to increase the size of the image field and to produce a lens system capable of forming a real image of an infinitely distant object, the convergent meniscus collective lens I is provided adjacent the lens II. Therefore, an infrared refracting lens system is provided which is corrected for spherical aberration and sine condition coma and which is capable of forming a real image at the design aplanatic point. Since the material used for both lenses is silicon with a high refractive index of 3.45 which varies only slightly at the infrared wavelength of 3.5 microns, the aplanatic surface can be flatter than if it were made of glass, and therefore will present a more favorable situation for correction of field abberations at very high relative apertures.

The specifications of the aforedescribed lens are shown in FIG. 1b and the optical data therefor are shown in FIG. 1c for a relative aperture of $f/1$ and an equivalent focal length of 118.43 millimeters. In the lens specification tabulation of FIG. 1b, N is the index of refraction of silicon calculated at a wavelength of 3.5 microns, and R, T and S refer to the radii of curvature of the refractive surfaces, the thickness of each lens and the air spacing therebetween, respectively. As shown in FIG. 1c, the optical data for the silicon doublet, the spherical aberration and sine condition coma are practically negligible, and at small field angles the meridional circle of confusion diameter and the astigmatism are small.

Referring now to FIG. 2a, a slight improvement in field behavior can be attained by placing a weak meniscus collective element III of silicon on the object side of the basic doublet combination shown in FIG. 1. In FIG. 2b, the optical data of this modified lens system indicate a negligible difference in astigmatism between it and the system of FIG. 1a, but an improvement in the meridional circle of confusion diameter over the specified field angles.

Referring now to FIG. 3a, a lens system is shown including the basic silicon doublet shown in FIG. 1a but having optical properties greatly different therefrom due to the further provision of a plano-convex element IV in the image space of the doublet near the focal plane. The convex surface 12 of this lens is approximately concentric with the image, which is formed to the right of the plano surface in the drawing. The material of this lens IV is sapphire, having an index of refraction of 1.695, in order to permit the beam of relative aperture of $f/1$ to merge into air. For refractive indices above about 1.8, the marginal rays are totally internally reflected at the plano surface; however, these materials are suitable for immersion systems, allowing improved definition and the use of the higher refractive materials at greater lens speeds.

The lens system of FIG. 3a is a distinct improvement over the lens systems of FIGS. 1a and 2a, although the overall length at a standard focal length is increased and the meridional circle of confusion diameters are much the same as previously over the field. The significant improvement is in the flattening of the field and the considerable improvement of the astigmatism, as shown in the optical data tabulated in FIG. 3b.

It should be noted that all of the embodiments shown in FIGS. 1a, 2a and 3a provide infrared refracting lens systems giving very good definition over a 15 degree full field at a relative aperture of $f/1$, and over a larger field at smaller relative apertures. Moreover, these lens systems are relatively stable when subjected to wavelength changes. A change in the indices of refraction of about 0.6%, which corresponds to about a 1.4 micron decrease for silicon and a 0.25 micron decrease for sapphire near the 3.5 micron region, will result in only slight changes in third order aberrations.

Other similar arrangements and modifications can be devised by one skilled in the art without departing from the spirit and scope of the invention. For example, it is possible to include components of optical elements other than silicon or sapphire having useful transmission in the infrared spectral region concerned, such as Irtran 2 having an index of refraction of approximately 2.25 at an infrared wavelength of 3.5 microns. An Irtran 2 lens, however, does not have quite the performance of a silicon lens, owing to the lower index of refraction of the former.

While the invention has been described in detail for the preferred forms shown, it will be understood that further modifications may be made within the scope of the invention as defined in the appended claim.

What is claimed is:

An infrared refracting lens system comprising in spaced axial alignment from the object space to the image space,
a convergent meniscus collective lens and an aplanatic meniscus lens each composed of silicon to thereby form a silicon doublet,
and a plano-convex lens composed of sapphire and positioned in the image space of the silicon doublet near the focal plane thereof with the convex surface facing said aplanatic meniscus lens,
wherein the surfaces of the convergent meniscus lens on the object and image sides thereof have radii of curvature which are, respectively, approximately 3.04 and 4.71 times the focal length of said silicon doublet,
the surfaces of the aplanatic lens on the object and image sides thereof have radii of curvature which are, respectively, approximately 0.75 and 0.84 times the focal length of said silicon doublet,
the thickness of each of the lenses forming said silicon doublet is approximately 0.13 times the focal length of the doublet,
and the length of the air space separating the lenses forming said silicon doublet is approximately 0.0084 times the focal length of the doublet.

References Cited by the Examiner

UNITED STATES PATENTS

| 2,417,330 | 3/1947 | Strang | 88—57 |
| 2,649,021 | 8/1953 | Angenieux | 88—57 |
| 2,659,271 | 11/1953 | Treuting | 88—57 |
| 3,002,092 | 9/1961 | Cary | 88—57 X |

OTHER REFERENCES

Astheimer et al.: "Infrared Radiometric Instruments on Tiros II," Journal of The Optical Society of America, volume 51, No. 12, pages 1386–1393, December 1961, QC350–O6.

JEWELL H. PEDERSEN, *Primary Examiner.*

JOHN K. CORBIN, *Examiner.*